United States Patent
Miyazaki et al.

(10) Patent No.: US 9,939,055 B2
(45) Date of Patent: *Apr. 10, 2018

(54) BALL SCREW AND SEAL USED THEREIN

(71) Applicant: NSK Ltd., Shinagawa-ku, Tokyo (JP)

(72) Inventors: Kazunari Miyazaki, Fujisawa (JP); Daisuke Maruyama, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/037,724

(22) PCT Filed: Nov. 27, 2014

(86) PCT No.: PCT/JP2014/005940
§ 371 (c)(1),
(2) Date: May 19, 2016

(87) PCT Pub. No.: WO2015/079698
PCT Pub. Date: Jun. 4, 2015

(65) Prior Publication Data
US 2016/0290456 A1 Oct. 6, 2016

(30) Foreign Application Priority Data
Nov. 28, 2013 (JP) .................. 2013-246343

(51) Int. Cl.
F16H 25/24 (2006.01)
F16H 25/22 (2006.01)
F16H 57/04 (2010.01)

(52) U.S. Cl.
CPC ..... *F16H 25/2418* (2013.01); *F16H 25/2204* (2013.01); *F16H 57/0406* (2013.01); *F16H 57/0464* (2013.01); *F16H 57/0497* (2013.01)

(58) Field of Classification Search
CPC ............. F16H 25/2418; F16H 57/0497; F16H 57/0464; F16H 57/0406; F16H 25/2204
See application file for complete search history.

(56) References Cited

U.S. PATENT DOCUMENTS 2,793,538 A * 5/1957 Sears .................. F16H 25/2418
15/256.5
5,906,136 A * 5/1999 Yabe ................... F16C 33/3713
277/562

(Continued)

FOREIGN PATENT DOCUMENTS

JP 10-205606 A 8/1998
JP 10-299854 A 11/1998

(Continued)

OTHER PUBLICATIONS

International Preliminary Report on Patentability (PCT/IB/338 & PCT/IB/373) issued in PCT Application No. PCT/JP2014/005940 dated Jun. 9, 2016, including English translation of document C2 (Japanese-language Written Opinion (PCT/ISA/237) previously filed on May 19, 2016 (Seven (7) pages).

(Continued)

*Primary Examiner* — Victor L MacArthur
(74) *Attorney, Agent, or Firm* — Crowell & Moring LLP

(57) ABSTRACT

There are provided a ball screw that more efficiently prevents accumulation and scattering of extra grease in a nut and a seal used in the ball screw. In order to do that, a grease reservoir portion is provided on an inner peripheral surface of a seal provided at an end of a nut on rear side of a moving direction of a ball screw so as to form a space with respect to a screw shaft. The grease reservoir portion is open to an outer peripheral surface of the seal and communicates with slits formed on the outer peripheral surface of the seal.

1 Claim, 6 Drawing Sheets

(56) References Cited

U.S. PATENT DOCUMENTS

| | | | | |
|---|---|---|---|---|
| 6,216,821 | B1* | 4/2001 | Namimatsu | F16H 25/2418 184/99 |
| 6,276,225 | B1* | 8/2001 | Takeda | F16H 25/2418 277/354 |
| 6,571,653 | B1* | 6/2003 | Takeda | F16H 25/2418 277/354 |
| 6,732,599 | B2* | 5/2004 | Michioka | F16H 25/2418 277/354 |
| 7,089,819 | B2* | 8/2006 | Yabe | F16C 29/06 74/89.4 |
| 2006/0096397 | A1* | 5/2006 | Michioka | F16H 25/2204 74/89 |
| 2007/0227278 | A1* | 10/2007 | Tsou | F16H 25/2418 74/89.4 |
| 2008/0196523 | A1 | 8/2008 | Liu | |
| 2016/0290483 | A1* | 10/2016 | Miyazaki | F16H 57/0497 |
| 2016/0298757 | A1* | 10/2016 | Miyazaki | F16H 25/2418 |

FOREIGN PATENT DOCUMENTS

| | | |
|---|---|---|
| JP | 3692677 B2 | 9/2005 |
| JP | 2007-232051 A | 9/2007 |
| JP | 2007-255661 A | 10/2007 |

OTHER PUBLICATIONS

International Search Report (PCT/ISA/210) Issued in PCT Application No. PCT/JP2014/005940 dated Mar. 3, 2015 with English translation (Four (4) pages).

Japanese-language Written Opinion (PCT/ISA/237) issued in PCT Application No. PCT/JP2014/005940 dated Mar. 3, 2015 (Four (4) pages).

Extended European Search Report issued in counterpart European Application No. 14865130.0 dated May 30, 2017 (Nine (9) pages).

\* cited by examiner

BALL SCREW AND SEAL USED THEREIN

TECHNICAL FIELD

The present invention relates to seals with slits and ball screws including the same.

BACKGROUND ART

An example of ball screws including a seal with slits is a ball screw disclosed in PTL 1. The seal provided in the ball screw is a contact seal having a cylindrical shape and has a seal mountain that is engaged with a helical groove of a screw shaft on an inner periphery thereof. The seal is mounted in a nut in such a manner that a part of the seal protrudes outward from an end face of the nut. Additionally, the protruding part is split by a plurality of slits. The length of the slits is made to be 0.7 times or more than a lead of the screw shaft.

Herein, the ball screw disclosed in PTL 1 satisfies a relationship of $0<\theta 1 \leq \theta$, where an angle between the slits extending in an axial direction and a screw shaft line is $\theta 1$ and a lead angle of the screw shaft is $\theta$. Additionally, the slits are inclined by $\theta 2$ with respect to a vertical direction on a circumferential surface of the shaft. Foreign matter entering from a direction outside the nut hits against an inner peripheral surface of the seal contacted with the shaft, climbs up in a direction of the angle $\theta 2$, and is scraped out onto an outer peripheral surface of a seal trunk. After that, the foreign matter accumulated to some extent naturally falls by its own weight from the outer peripheral surface of the seal trunk.

CITATION LIST

Patent Literature

PTL 1: Japanese Patent No. 3692677

SUMMARY OF INVENTION

Technical Problem

However, in the ball screw of PTL 1, a gap between the inner peripheral surface of the seal and the surface of the screw shaft is uniform and very small. Due to this, although grease on the surface of the screw shaft is plated with a constant small thickness, the grease can be simultaneously swept by an end of the seal. Thereby, extra grease gathers at the end of the seal or the extra grease can be also accumulated on the screw shaft and scattered by centrifugal force of the screw shaft. Thus, there has been room for improvement.

The present invention has been accomplished by focusing on the above problem. It is an object of the invention to provide a ball screw that more efficiently prevents accumulation and scattering of extra grease in a nut and a seal used therein.

Solution to Problem

In order to solve the above problem, the present inventors repeated intensive and extensive studies and consequently found out that it is enough for a seal to have a function of taking out extra grease at a position where the centrifugal force of a screw shaft hardly acts on.

The present invention is based on the knowledge obtained by the present inventors, and an aspect of a ball screw for solving the above problem includes a screw shaft, a nut, and a plurality of balls, in which the screw shaft passes through the nut, a rolling path along which the balls roll is formed by a helical groove formed on an outer peripheral surface of the screw shaft and a helical groove formed on an inner peripheral surface of the nut, the balls are disposed in the rolling path, and a seal is attached to at least one end of ends of the nut in a moving direction of the nut.

The seal surrounds an outer periphery of the screw shaft and comprises: a seal mountain inside the seal entering the helical groove of the screw shaft; a tubular portion exposed axially outside the nut; a grease reservoir portion provided on an inner peripheral surface of the tubular portion so as to form a space with respect to the screw shaft; a discharge outlet communicating with the grease reservoir portion and open to an outer peripheral surface of the tubular portion; and a slit communicating with the discharge outlet, extending in the tubular portion of the seal in parallel with an axial line of the screw shaft.

In addition, in the above ball screw, a gap may be provided between the outer peripheral surface of the screw shaft and an inner peripheral surface of the seal, and a gap size between the helical groove of the screw shaft and the inner peripheral surface of the seal may be larger than a gap size between a land portion of the screw shaft and the inner peripheral surface of the seal.

The respective gap sizes are sizes in the radial direction of the screw shaft. It is to be noted that the gap size between the land portion of the screw shaft and the inner peripheral surface of the seal may be preferably 0.3 mm or less.

An aspect of a seal for solving the above problem is provided at each of both ends of a ball screw, the ball screw including a screw shaft, the nut through which the screw shaft passes, and balls rolling along a rolling path formed by a helical groove formed on an outer peripheral surface of the screw shaft and a helical groove formed on an inner peripheral surface of the nut, in which the nut and the screw shaft relatively move via the balls.

The seal surrounds an outer periphery of the screw shaft and comprises: a seal mountain inside the seal entering the helical groove of the screw shaft; a tubular portion exposed axially outside the nut; a grease reservoir portion provided on an inner peripheral surface of the tubular portion so as to form a space with respect to the screw shaft; a discharge outlet communicating with the grease reservoir portion and open to an outer peripheral surface of the tubular portion; and a slit communicating with the discharge outlet, extending in the tubular portion in parallel with an axial line of the screw shaft.

In addition, in the above seal, an inner peripheral surface of the seal may be formed so that when the seal is mounted in the nut, a gap is provided between the outer peripheral surface of the screw shaft and the inner peripheral surface of the seal and a gap size between the helical groove of the screw shaft and the inner peripheral surface of the seal is larger than a gap size between a land portion of the screw shaft and the inner peripheral surface of the seal.

The respective gap sizes are sizes in the radial direction of the screw shaft. It is to be noted that the gap size between the land portion of the screw shaft and the inner peripheral surface of the seal may be preferably 0.3 mm or less.

Advantageous Effects of Invention

According to the an aspect of the present invention, there can be provided a low-cost ball screw that more efficiently prevents accumulation and scattering of extra grease in a nut and a seal used in the same.

BRIEF DESCRIPTION OF DRAWINGS

FIGS. 2A and 2B are diagrams depicting a structure of a seal in an aspect of the ball screw, in which FIG. 2A is an axial sectional view and FIG. 2B is a partial sectional view depicting a positional relationship with a screw shaft;

FIGS. 6A to 6C are diagrams depicting a mechanism in which scattering of grease is prevented by the ball screw and the seal used therein, in which FIG. 6A is an axial sectional view, FIG. 6B is a front view depicting an effect of the seal positioned on a front side in a moving direction of a nut, and FIG. 6C is a back view depicting an effect of the seal positioned on a rear side in the moving direction of the nut.

DESCRIPTION OF EMBODIMENTS

In the following detailed description, many specific details will be described to provide thorough understanding of embodiments of the present invention. However, it will be apparent that even without such specific details, one or more embodiments can be implemented. In addition, for simplifying the drawings, well-known structures and devices are depicted in schematic views.

Hereinafter, a description will be given of an embodiment of a ball screw with reference to the drawings.
(Structure)

Figure 1:
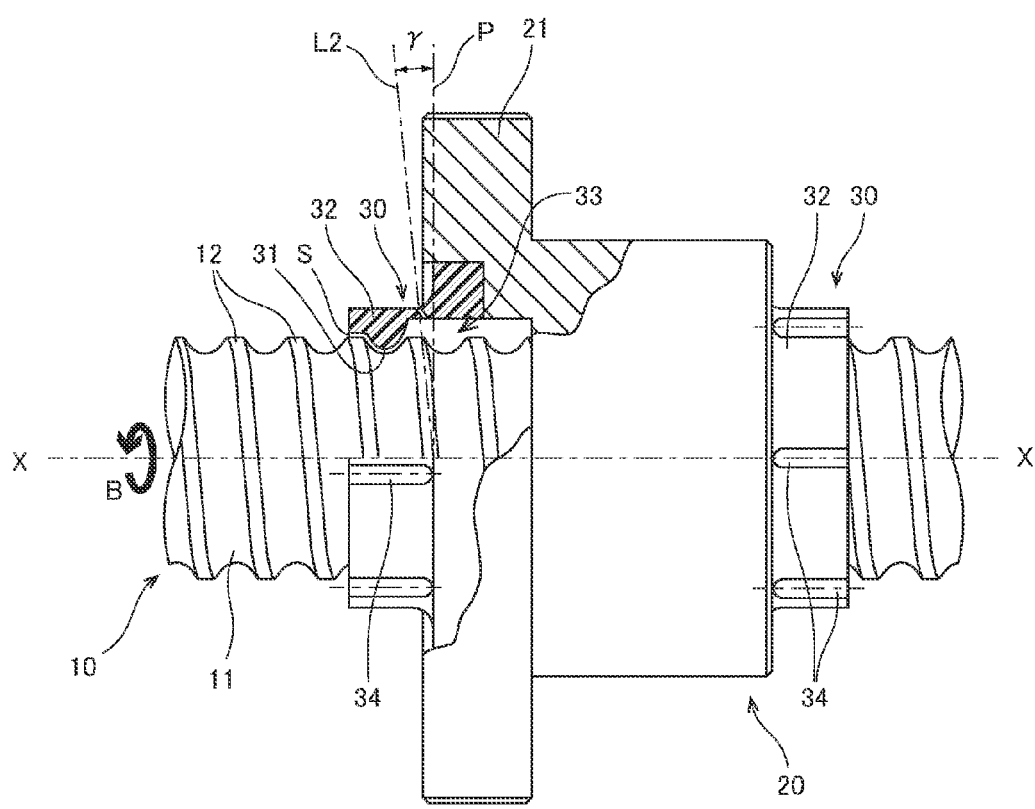
FIG. 1 is a partially sectioned side view depicting a structure in an aspect of a ball screw.

As depicted in FIG. 1, a ball screw 1 of the present embodiment includes a screw shaft 10, a nut 20, and a plurality of balls (unillustrated).

The nut 20 has a tubular shape (e.g., a cylindrical shape) with a through-hole formed therein and is installed so that the screw shaft 10 passes through the through-hole.

On an outer peripheral surface of the screw shaft 10 is formed a helical groove 11, and also, on an inner peripheral surface of the nut 20 is formed a helical groove (unillustrated) with the same lead as that of the helical groove 11. A rolling path along which the plurality of balls (unillustrated) roll is formed by the helical groove 11 and the helical groove (unillustrated) of the nut 20.

Then, in the ball screw 1 thus structured, the nut 20 and the screw shaft 10 are relatively movable via the balls disposed and rolling in the rolling path.

The screw shaft 10 is rotatably axially supported to a machine base (unillustrated) in which the ball screw 1 is installed, and connected to a rotary drive source (unillustrated) such as a motor. In addition, a flange 21 is formed at one end of the nut 20, and a mobile body (unillustrated) such as a mobile table that is driven forward and backward by the ball screw 1 is mounted via the flange 22. Thus, rotation of the screw shaft 10 drives the above mobile body forward and backward via the nut 20.

<Seal>

Furthermore, in the ball screw 1 of the present embodiment, a seal 30 is attached to an end of the nut 20 on a rear side of a moving direction of at least the nut 20. Herein, as described above, in the ball screw 1 in which the nut 20 moves forward and backward with respect to the screw shaft 10, the seal 30 is preferably attached to each of both ends of the nut 20 in an axial direction (the moving direction) thereof.

The seal 30 surrounds the outer peripheral surface of the screw shaft 10 and includes thereinside a seal mountain 31 entering the helical groove 11 of the screw shaft 10 and a tubular portion 32 exposed axially outside the nut 20.

Figure 2A:
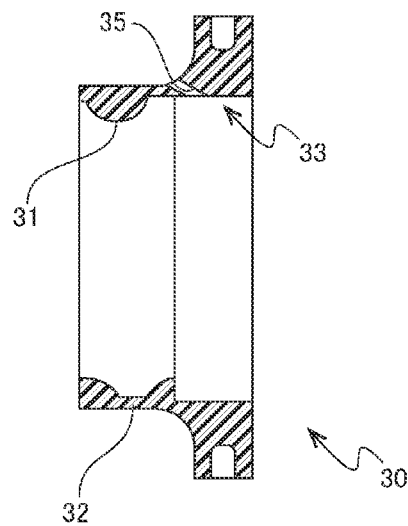

Additionally, in the seal 30 is provided a grease reservoir portion 33 on an inner peripheral surface of the tubular portion 32 so as to form a space with respect to the screw shaft 10, as depicted in FIG. 2A. The grease reservoir portion 33 is formed so that the inner peripheral surface thereof is enlarged in diameter from one end of the seal 30 exposed from the end of the nut 20 to the other end of the seal 30 buried in the nut 20. In other words, the inner diameter of the one end of the seal 30 is a diameter enough to contact with the land portion 12 of the screw shaft 10, and the inner diameter of the other end of the seal 30 is enlarged greater than the inner diameter of the one end of the seal 30.

Figure 6A:
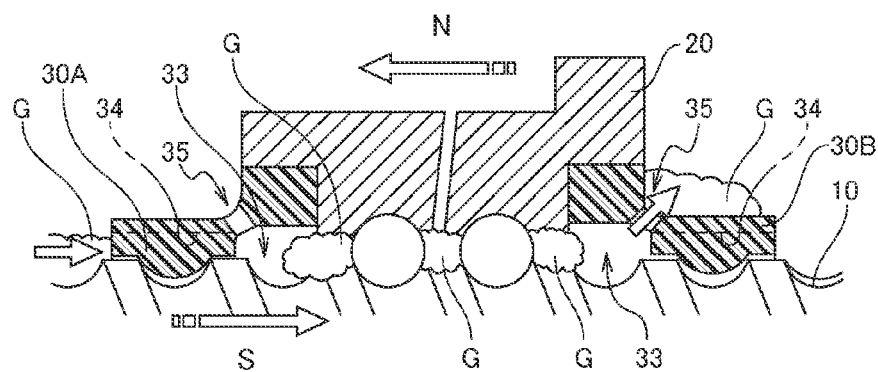
Figure 6B:
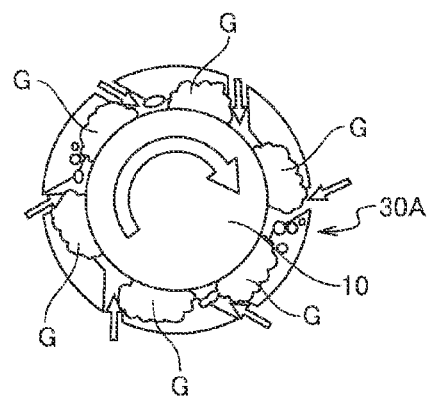
Figure 6C:
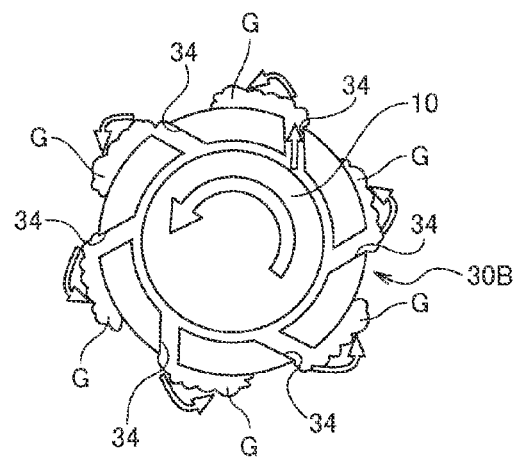

Additionally, in the seal 30 is provided a discharge outlet 35 communicating with the grease reservoir portion 33 and open to an outer peripheral surface of the tubular portion (see FIGS. 6A to 6C).

The discharge outlet 35 is provided extending axially from an axially outer end of the tubular portion 32. In addition, an opening portion of the discharge outlet 35 on the outer peripheral surface of the tubular portion 32 has preferably a circular shape so that grease is easily pushed out from the grease reservoir portion 33.

[Gap]

Figure 2B:
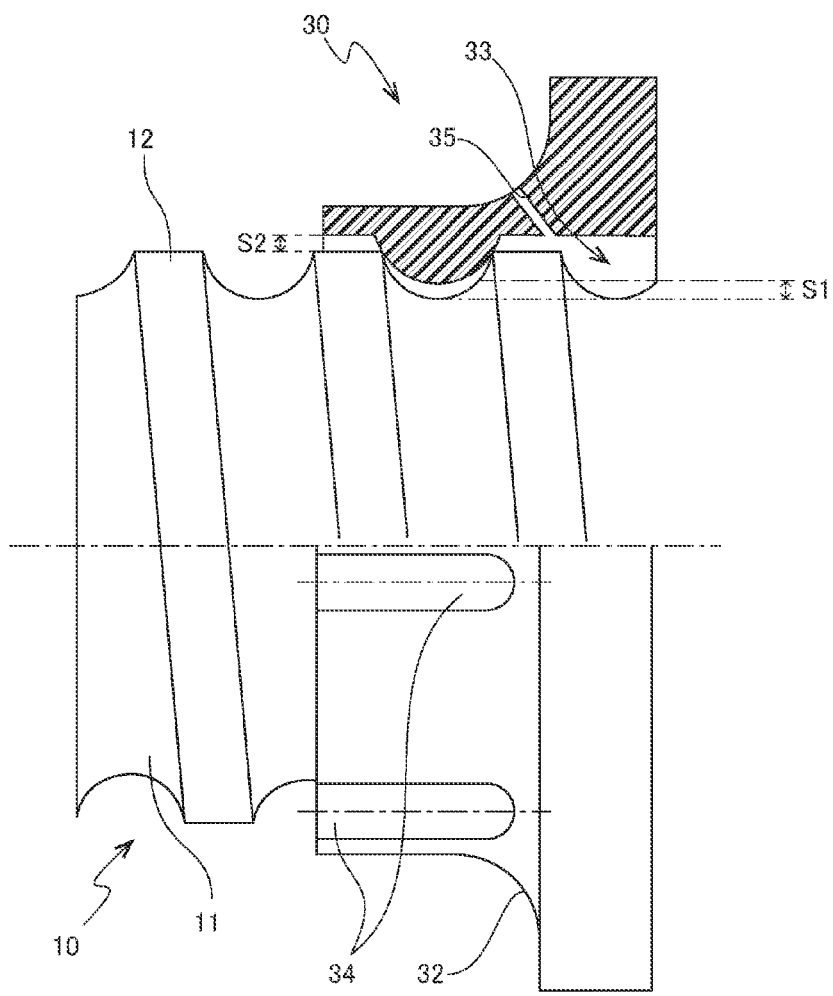

A gap S is provided between the outer peripheral surface of the screw shaft 10 and the inner peripheral surface of the seal 30. Then, a gap size S1 between (a bottom portion of) the helical groove 11 of the screw shaft 10 and the inner peripheral surface of the seal 30 is preferably larger than a gap size S2 between the land portion 12 between the helical grooves 11 of the screw shaft 10 and the inner peripheral surface of the seal 30 (see FIG. 2B). The respective gap sizes S1 and S2 are sizes in the radial direction of the screw shaft 10. Additionally, the gap size S2 is preferably 0.3 mm or less.

Herein, sectional shapes of conventional seals have been formed into a uniform. Gothic arch shape so that the gap sizes S1 and S2 become substantially the same in accordance with a sectional shape of the helical groove 11 that is a Gothic arch shape. On the other hand, the sectional shape of the seal of the present embodiment is formed into, for example, a simple R-shape, so that the gap size S1 is made larger than the gap size S2.

By defining the gap sizes S1 and S2 this way, the sectional shape of the seal 30 becomes a shape that makes it easier for grease adhering to the surface of the screw shaft 10 to enter the nut 20.

[Slit]

Furthermore, in the tubular portion 32 of the seal 30 is formed a slit 34 extending in an axis direction thereof from the axially outer end thereof.

Herein, the slit 34 is provided in the same phase as an installation position of the discharge outlet 35 in a circumferential direction of the seal 30 and communicates with the discharge outlet 35.

In this way, providing the slit 34 in the axis direction of the cylindrical seal 30 facilitates a production of the seal 30 by injection molding, and this leads to cost reduction.

The slit 34 is provided in six positions at equal intervals in a circumferential direction of the tubular portion 32. However, the number of the slits 34 can be any other number in consideration of the number of discharge outlets 35 and respective functions that will be described later. In addition, preferably, all of the slits 34 communicate with the discharge outlets 35. However, there may be provided a slit 34 not communicating with the discharge outlet 35.

Figure 3:
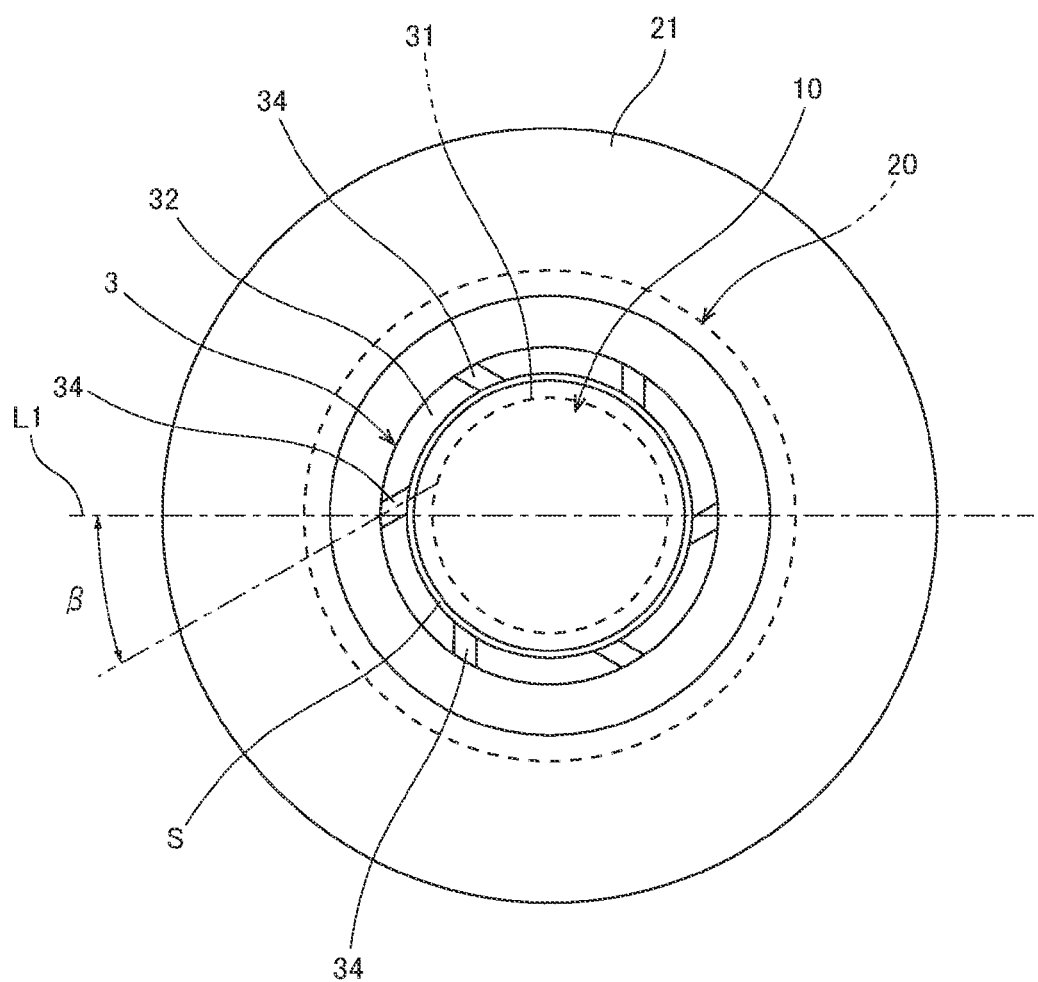
FIG. 3 is a front view depicting a structure in an aspect of the ball screw.

The slits 34 are inclined at an angle β with respect to a line L1 in the diameter direction of the screw shaft 10 in the counterclockwise direction as viewed from the outer end face of the tubular portion 32 to the axial direction of the screw shaft 10 when the screw shaft 10 has right-hand threads (see FIG. 3). Additionally, the screw shaft 10 depicted in FIG. 3 has right-hand threads, and FIG. 3 depicts a state in which the seal 30 on the left side of FIG. 1 is viewed from the left of FIG. 1. In addition, even when the seal 30 on the right side of FIG. 1 is viewed from the right of FIG. 1, it appears the same as the seal 30 of FIG. 3. Additionally, in the case of the screw shaft 10 having left-hand threads, the inclination angle β of the slits 34 will be made to be inclined clockwise with respect to the line L1, which is opposite to the direction of the right-hand threads.

Figure 4:
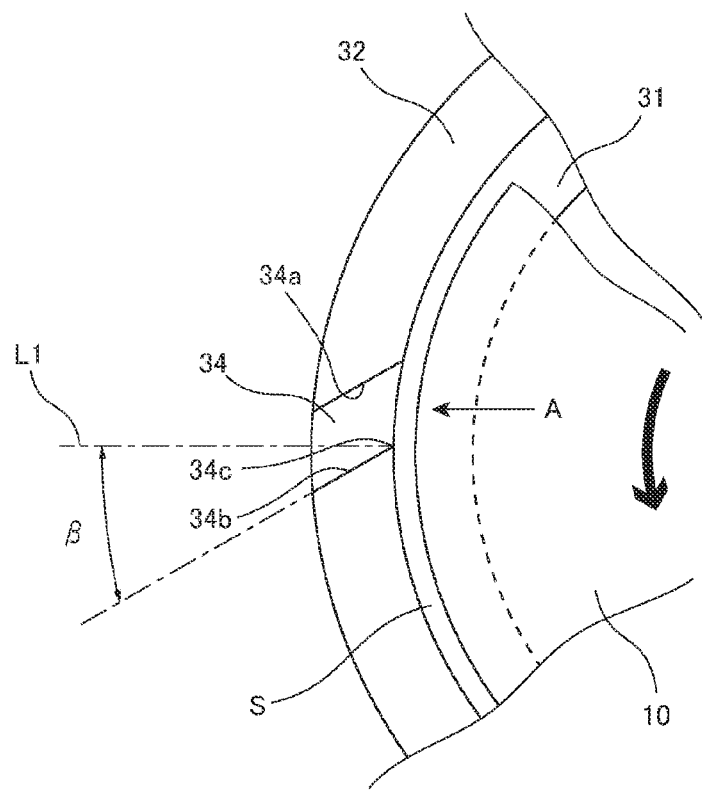
FIG. 4 is a partially enlarged view of FIG. 3.
Figure 5:
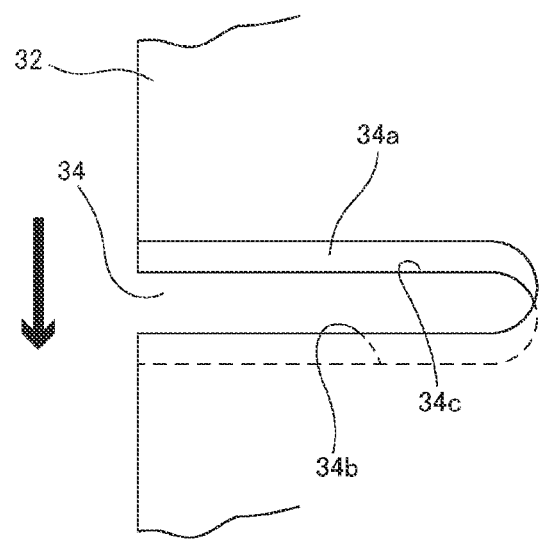
FIG. 5 is a diagram of a slit as viewed from an arrow A in FIG. 4.

Additionally, since all of the slits 34 are formed with the same width size in the direction of the angle β, opposing two inner surfaces 34a and 34b (see FIGS. 4 and 5) of the slits 34 are mutually parallel surfaces, and the respective surfaces 34a and 34b are also inclined at the angle β. Thus, of the opposing two surfaces (34a, 34b), the surface 34b located on a rotating direction side of the screw shaft 10 forms a sharp angle with the inner peripheral surface of the tubular portion 32 of the seal 30, thereby forming an edge portion 34c thereat. Additionally, arrows in FIGS. 4 and 5 depict the rotation direction of the screw shaft 10.

(Behavior)

Next, a behavior of the ball screw of the present embodiment will be described with reference to FIGS. 6A to 6C.

FIGS. 6A to 6C are diagrams depicting a mechanism in which scattering of grease is prevented by the ball screw of the present embodiment and the seal used therein. FIG. 6A is an axial sectional view; FIG. 6B is a front view depicting an effect of the seal positioned on a front side in the moving direction of the nut; and FIG. 6C is a back view depicting an effect of the seal positioned on the rear side of the moving direction of the nut. Additionally, in FIGS. 6A to 6C, the description will be given by designating the seal positioned on the front side of the moving direction of the nut 20 as seal 30A and the seal positioned on the rear side of the moving direction of the nut 20 as seal 30B. In addition, an arrow "N" of FIG. 6A indicates the moving direction of the nut 20, and an arrow "S" thereof indicates a moving direction of the screw shaft 10.

First, when operating the ball screw 1, the ball screw 1 is operated in a state where grease is filled in a space between the nut 20 and the screw shaft 10. Herein, for example, when the screw shaft 10 is rotated leftward in a rotation direction B as viewed in the right direction from the left in FIG. 1, the nut 20 moves in the right direction in FIG. 1. The movement of the nut 20 is performed while leaving grease in the nut 20 behind on the surface of the screw shaft 10 at a predetermined film thickness from the gap S between the inner peripheral surface of the tubular portion 32 of the seal 30 and the screw shaft 10.

At this time, a grease G adhering to the surface of the screw shaft 10 and being about to come out of the nut 20 is scraped off at the tubular portion 32 of the seal 30B and, due to the counteraction of the tubular portion 32, discharged to an outer periphery of the tubular portion 32 through the grease reservoir portion 33, the discharge outlets 35, and the slits 34 of the seal 30B. Thus, the grease left behind on the surface of the screw shaft 10 does not exceed the above film thickness.

Then, the grease G is guided through the following steps (1) to (5) and finally accumulated on the outer peripheral surface of the seal 30B, whereby the influence of rotation of the screw shaft 10 is eliminated, so that grease scattering can be prevented.

(1) First, as depicted in FIG. 6B, grease on the screw shaft 10 is caught in the nut 20 via a gap between the seal 30A and the screw shaft 10.

(2) Next, as depicted in FIG. 6A, the grease enters the nut 20 through a gap between the helical groove 11 and the seal 30A.

(3) Next, as depicted in FIG. 6A, the grease entering the nut 20 is forced to surge to the land portions 12 by balls.

(4) Then, as depicted in FIG. 6A, the grease surging to the land portions 12 is accumulated in the grease reservoir portion 33 formed by the screw shaft 10 and the seal 30B.

(5) Then, as depicted in FIGS. 6A and 6C, the grease accumulated in the grease reservoir portion 33 is discharged from the nut 20 through the discharge outlets 35 of the seal 30B, guided along the slits 34, and accumulated on the outer peripheral surface of the seal 30B.

At this time, the outer peripheral surface of the seal 30B on which extra grease G in the nut 20 is discharged is a place in which centrifugal force does not act on the grease G. Accordingly, the grease G is not scattered around by centrifugal force and falls in drops by its own weight to a part below the screw shaft 10 not associated with the scattering. Thus, no harmful effect due to the scattering of the grease G occurs.

In this way, the extra grease G that falls through the slits 34 of the seal 30 falls from the seal 30B located behind the nut 20 upon movement thereof. Accordingly, in FIGS. 1 to 7, when the screw shaft 10 is rotated leftward as viewing the right from the left in FIG. 1, the nut 20 moves in the right direction in FIG. 1 and the grease G falls from the seal 30 located behind the nut 20 at that time, which is on the left side in FIG. 1. Accordingly, when the screw shaft 10 is rotated in an opposite direction, the nut 20 moves in the left direction in FIG. 1, and similarly, the grease falls from the seal 30 located behind the nut 20 at that time, which is on the right side in FIG. 1.

As described hereinabove, in the ball screw of the present embodiment, the grease G in the nut 20 is discharged onto the outer periphery of the tubular portion 32 through the grease reservoir portion 33, the discharge outlets 35, and the slits 34 of the seal 30B provided at the rear end of the nut 20 in the moving direction thereof. Thus, since the extra grease in the nut 20 is taken outside at the position where the centrifugal force of the screw shaft 10 hardly acts on, the grease does not scatter around.

Particularly, since the slits 34 communicate with the grease reservoir portion 33, the seal 30 installed on the front side in the moving direction of the nut can effectively return extra grease adhering to the surface of the screw shaft 10 into the nut 20. Then, the extra grease is guided onto the outer surface of the seal 30 via the slits 34, thereby avoiding the extra grease not contributing to lubrication in the nut 20 from adhering to the screw shaft 10, so that scattering of the grease can be effectively prevented.

Additionally, providing the slit 34 in the axis direction of the cylindrical seal 30 facilitates a production of the seal 30 by injection molding, and this leads to cost reduction of the ball screw and the seal.

Figure 7:
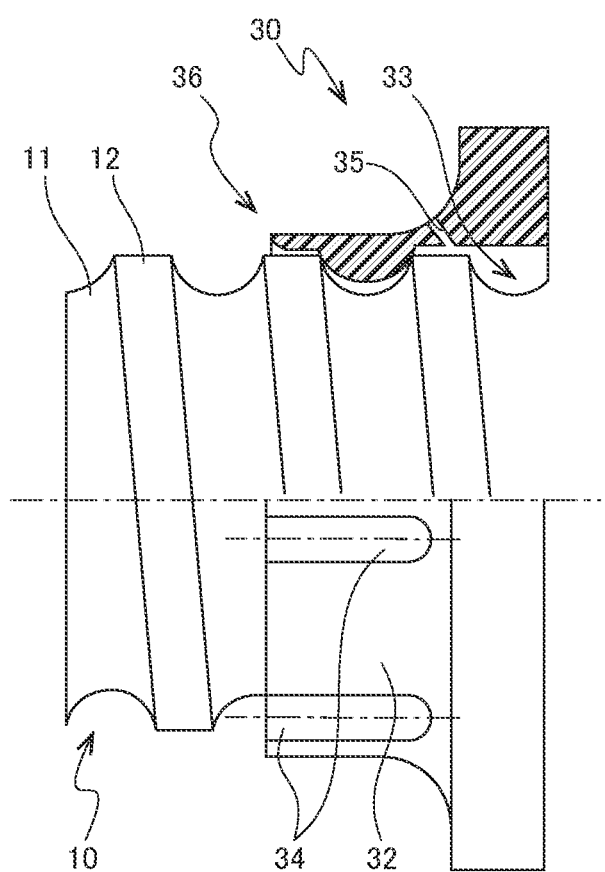
FIG. 7 is an axial sectional view of a mode in which chamfering is performed on an inner peripheral surface of an end of the seal in a structure of another embodiment of the ball screw.

Herein, as an another embodiment, as depicted in FIG. 7, preferably, chamfering is performed on an inner diameter of an end face 36 of the seal 30 so as to have a shape that makes it easier to guide grease into the nut 20. The shape, angle, and the like of chamfering on the end face 36*c* are not particularly limited as long as chamfering is performed on the inner diameter side thereof.

The ball screw of the present invention is suitable to ball screws and sliding screws such as triangular screws and trapezoidal screws used in, for example, semiconductor element manufacturing apparatuses, liquid crystal display panel manufacturing apparatuses and conveyor apparatuses, and other apparatuses used in clean environments.

While the present invention has been described with reference to the specific embodiments hereinabove, the invention is intended not to be limited thereto. By referring to the description of the present invention, various modifications of the disclosed embodiments and other embodiments of the invention are apparent to those skilled in the art. Accordingly, it should be understood that the appended claims encompass these modifications or embodiments included in the scope and gist of the invention. In addition, although the above embodiments have been described by exemplifying the case of the screw shaft 10 having the right-hand threads, the screw shaft 10 obviously may be one having left-hand threads. In this case, the angle β of the slits 34 depicted in FIG. 3 is opposite to that in FIG. 3, as described above.

REFERENCE SIGNS LIST

1: Ball screw
10: Screw shaft
11: Helical groove
20: Nut
30: Seal
31: Seal mountain
32: Tubular portion
33: Grease reservoir portion
34: Slit
35: Discharge outlet
S: Gap

The invention claimed is:

1. A ball screw comprising a screw shaft, a nut, and a plurality of balls, wherein,
the screw shaft passes through the nut,
a rolling path along which the balls roll is formed by a helical groove formed on an outer peripheral surface of the screw shaft and a helical groove formed on an inner peripheral surface of the nut,
the balls are disposed in the rolling path,
a seal is attached to at least one end of ends of the nut in a moving direction of the nut,
the seal surrounds an outer periphery of the screw shaft and comprises:
a seal mountain inside the seal entering the helical groove of the screw shaft;
a tubular portion exposed axially outside the nut;
a grease reservoir portion provided on an inner peripheral surface of a part of the tubular portion disposed in the nut so as to form a space with respect to the screw shaft;
a discharge outlet communicating with the grease reservoir portion and open to an outer peripheral surface of the tubular portion; and
a slit communicating with the discharge outlet, extending in the tubular portion of the seal in parallel with an axial line of the screw shaft,
a gap is provided between the outer peripheral surface of the screw shaft and an inner peripheral surface of the seal, and
a gap size between the helical groove formed on the outer peripheral surface of the screw shaft and the seal mountain entering the helical groove is larger than a gap size between a land portion of the screw shaft and the inner peripheral surface of the seal.

\* \* \* \* \*